US007826809B2

United States Patent
Hwang et al.

(10) Patent No.: US 7,826,809 B2
(45) Date of Patent: Nov. 2, 2010

(54) METHOD AND APPARATUS FOR CONTROLLING GAIN OF TRANSMIT ANTENNA IN A COMMUNICATION SYSTEM

(75) Inventors: In-Seok Hwang, Seoul (KR);
Byoung-Ha Yi, Seoul (KR);
Soon-Young Yoon, Seoul (KR);
Jang-Hoon Yang, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 629 days.

(21) Appl. No.: 11/831,599

(22) Filed: Jul. 31, 2007

(65) Prior Publication Data
US 2008/0051045 A1 Feb. 28, 2008

(30) Foreign Application Priority Data
Jul. 31, 2006 (KR) .................. 10-2006-0072276

(51) Int. Cl.
*H04Q 11/12* (2006.01)
*H04K 3/00* (2006.01)
(52) U.S. Cl. .................................. 455/127.1; 370/334

(58) Field of Classification Search ................. 455/101, 455/127.1–127.3, 562.1; 370/334
See application file for complete search history.

(56) References Cited

U.S. PATENT DOCUMENTS
2006/0078059 A1  4/2006  Ok et al.
2010/0003931 A1*  1/2010  Krishnan et al. ............ 455/101

FOREIGN PATENT DOCUMENTS
KR   1020050077217    8/2005
KR   1020060052191    5/2006

* cited by examiner

*Primary Examiner*—Lee Nguyen
(74) *Attorney, Agent, or Firm*—The Farrell Law Firm, LLP

(57) ABSTRACT

An apparatus for controlling a gain of transmit antennas in a communication system. The transmit antenna gain control apparatus includes a controller for determining a gain of multiple transmit antennas on a basis of a transmit antenna having a minimum currently unused residual power among currently unused residual powers of the multiple transmit antennas used in the communication system.

14 Claims, 4 Drawing Sheets

| ANT No. | 1 | 2 | 3 | 4 |
|---|---|---|---|---|
| $h_{b,k}$ | $0.97e^{j\theta_1}$ | $0.1e^{j\theta_2}$ | $0.2e^{j\theta_3}$ | $0.1e^{j\theta_1}$ |
| $w_{b,k}$ | $0.97e^{-j\theta_1}$ | $0.1e^{-j\theta_2}$ | $0.2e^{-j\theta_3}$ | $0.1e^{-j\theta_1}$ |
| $|w_{b,k}|^2$ | 0.94 | 0.01 | 0.04 | 0.01 |

FIG.2

| ITEM (K=4, $P_{BS, MAX}$ = 20 Watt) | | Round-Robin 1 User | Proportional Fair 16 User |
|---|---|---|---|
| FIRST SCHEME | $P_{ANT,MAX}$ = 5 Watt | 3.8 Mbps (76%) | 6.1 Mbps (77%) |
| | $P_{ANT,MAX}$ = 7 Watt | 4.5 Mbps (90%) | 7.0 Mbps (89%) |
| | $P_{ANT,MAX}$ = 10 Watt | 5.0 Mbps (100%) | 7.8 Mbps (99%) |
| | $P_{ANT,MAX}$ = 20 Watt | 5.0 Mbps (100%) | 7.9 Mbps (100%) |
| SECOND SCHEME | $P_{ANT,MAX}$ = 5 Watt | 4.3 Mbps (86%) | 6.5 Mbps (82%) |
| | $P_{ANT,MAX}$ = 7 Watt | 4.9 Mbps (98%) | 7.4 Mbps (94%) |
| | $P_{ANT,MAX}$ = 10 Watt | 5.0 Mbps (100%) | 7.8 Mbps (99%) |

FIG.4

METHOD AND APPARATUS FOR CONTROLLING GAIN OF TRANSMIT ANTENNA IN A COMMUNICATION SYSTEM

PRIORITY

This application claims priority under 35 U.S.C. §119(a) to a Korean Patent Application filed in the Korean Intellectual Property Office on Jul. 31, 2006 and assigned Serial No. 2006-72276, the disclosure of which is incorporated herein by reference.

BACKGROUND OF THE INVENTION

1. Field of the Invention

The present invention relates generally to a method and apparatus for controlling a gain of transmit antennas in a communication system.

2. Description of the Related Art

Communication systems are evolving to provide services for enabling a high-speed, high-capacity data transmission/reception to Mobile Stations (MSs). To enable the high-speed, high-capacity data transmission/reception, various schemes for increasing a data rate and improving reliability of data transmission/reception have been proposed, and one of the typical proposed schemes is an antenna diversity scheme. The antenna diversity scheme, a multi-antenna scheme, is classified into a receive antenna diversity scheme including multiple receive antennas, a transmit antenna diversity scheme including multiple transmit antennas, and a Multiple Input Multiple Output (MIMO) scheme including multiple receive antennas and multiple transmit antennas.

However, when the transmit antenna diversity scheme and the MIMO scheme are used, i.e. when multiple transmit antennas are used, their diversity gain varies according to the way in which a transmission beam vector is generated. That is, the way of generating the transmission beam vector is an important factor affecting performance of the transmit antenna diversity scheme and MIMO scheme. The 'transmission beam vector' as used herein refers to a set of transmit antenna gains for each of the multiple transmit antennas, and when the number of the transmit antennas is M, the transmission beam vector includes M elements.

Therefore, there is a need for a scheme of generating a transmission beam vector to maximize a diversity gain in using multiple transmit antennas, i.e. for a scheme of controlling a transmit antenna gain.

SUMMARY OF THE INVENTION

An aspect of the present invention is to address at least the problems and/or disadvantages and to provide at least the advantages described below. Accordingly, an aspect of the present invention is to provide a method and apparatus for controlling a gain of transmit antennas in a communication system.

Another aspect of the present invention is to provide a method and apparatus for controlling a gain of transmit antennas on the basis of an antenna having a minimum currently unused residual power among currently unused residual powers of the multiple transmit antennas used in a communication system.

According to one aspect of the present invention, there is provided an apparatus for controlling a gain of transmit antennas in a communication system. The transmit antenna gain control apparatus includes a controller for determining a gain of multiple transmit antennas on a basis of a transmit antenna having a minimum currently unused residual power of among currently unused residual powers of the multiple transmit antennas.

According to another aspect of the present invention, there is provided a method for controlling a gain of transmit antennas in a communication system. The transmit antenna gain control method includes determining a gain of multiple transmit antennas on a basis of a transmit antenna having a minimum currently unused residual power among currently unused residual powers of the multiple transmit antennas.

BRIEF DESCRIPTION OF THE DRAWINGS

The above and other aspects, features and advantages of the present invention will become more apparent from the following detailed description when taken in conjunction with the accompanying drawings in which:

FIG. 2 is a table illustrating a phenomenon in which power concentration on a particular transmit antenna occurs when a controller determines a transmit antenna gain using the first scheme;

FIG. 4 is a table showing a change in a data rate of a transmission apparatus according to an embodiment of the present invention.

DETAILED DESCRIPTION OF THE PREFERRED EMBODIMENTS

Figure 1:
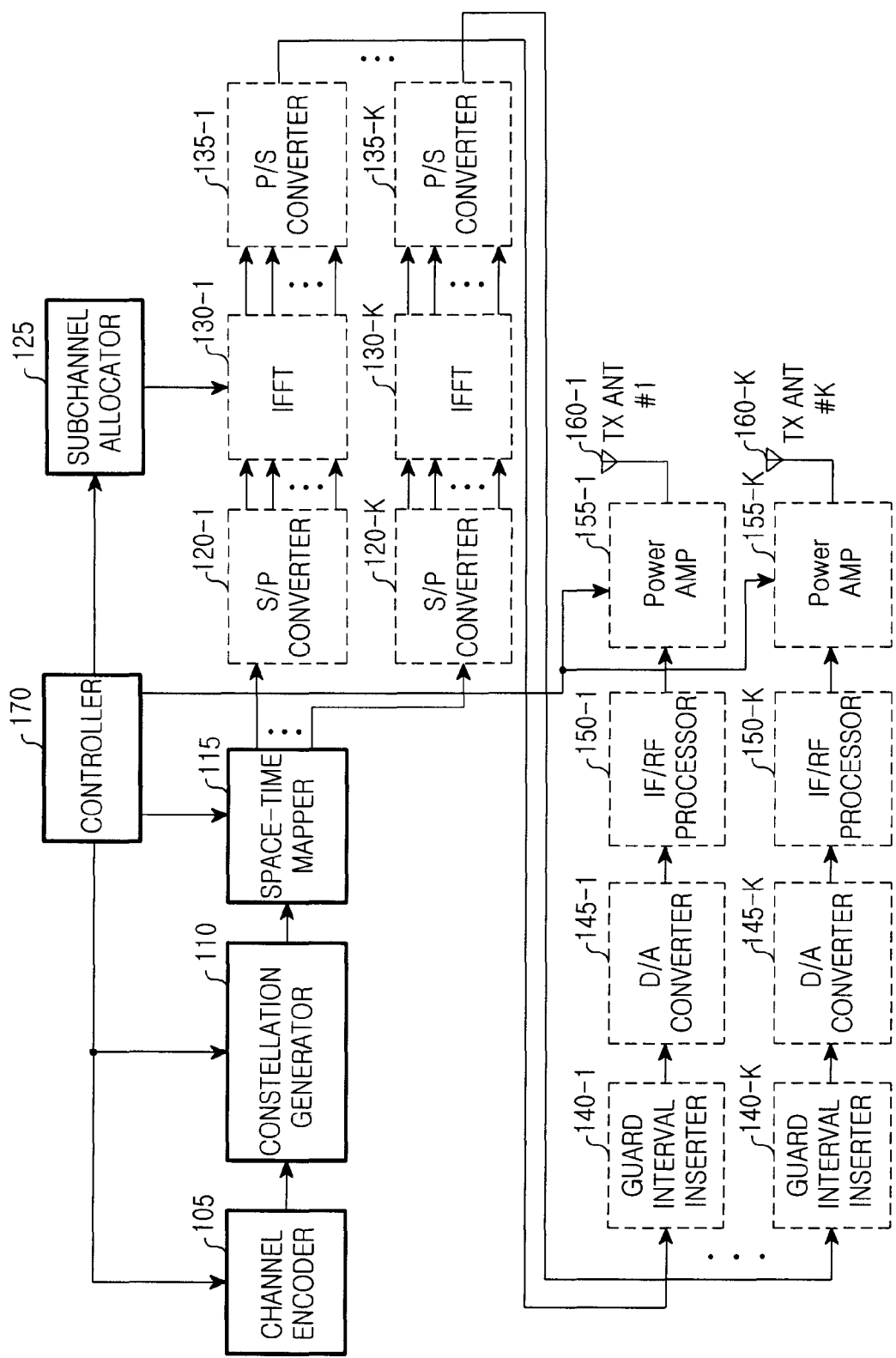
FIG. 1 is a diagram illustrating a structure of a signal transmission apparatus of a communication system using multiple antennas, e.g., K transmit antennas according to an embodiment of the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present invention provides a method and apparatus for controlling a gain of transmit antennas in a communication system. Although the method and apparatus for controlling the gain of transmit antennas will be described herein with reference to an Orthogonal Frequency Division Multiplexing (OFDM) communication system, by way of example, the transmit antenna gain control method and apparatus proposed by the present invention can be applied not only to the OFDM communication system but also to other communication systems.

FIG. 1 is a diagram illustrating a structure of a signal transmission apparatus of a communication system using multiple, for example, K transmit antennas according to an embodiment of the present invention.

Referring to FIG. 1, the signal transmission apparatus, or a Base Station (BS), includes a channel encoder 105, a constellation generator 110, a space-time mapper 115, a subchannel allocator 125, a controller 170, K Serial-to-Parallel (S/P) converters 120-1~120-K, K Inverse Fast Fourier Transform (IFFT) units 130-1~130-K, K Parallel-to-Serial (P/S) converters 135-1~135-K, K guard interval inserters 140-1~140-K, K Digital-to-Analog (D/A) converters 145-1~145-K, K Intermediate Frequency (IF)/Radio Frequency (RF) processors 150-1~150-K, K power amplifiers 155-1~155-K, and K transmit antennas 160-1~160-K.

If there are information data bits to be transmitted, the information data bits are input to the channel encoder 105. The channel encoder 105, under the control of the controller 170, channel-encodes the information data bits using a predetermined channel coding scheme, and outputs the coded information data bits to the constellation generator 110. An operation of determining a channel coding scheme of the channel encoder 105 by the controller 170 will be described below. The constellation generator 110 modulates the output signal of the channel encoder 105 under the control of the controller 170, and outputs the modulation signal to the space-time mapper 115. An operation of determining a modulation scheme of the constellation generator 110 by the controller 170 will be described below.

The space-time mapper 115, under the control of the controller 170, performs space-time mapping on the output signal of the constellation generator 110, and outputs the output signal of the constellation generator 110 to each of the K S/P converters 120-1~120-K in the same manner. Operations for paths 1 to K after the K S/P converters 120-1~120-K are almost similar to each other, so the description will be made herein with reference only to the path of the S/P converter 120-1, by way of example.

The S/P converter 120-1 parallel-converts the output signal of the space-time mapper 115, and outputs the resulting signal to the IFFT unit 130-1. The IFFT unit 130-1 maps the output signal of the S/P converter 120-1 to a corresponding subcarrier according to the subchannel allocation result of the subchannel allocator 125, performs IFFT thereon, and outputs the resulting signal to the P/S converter 135-1. The subchannel allocator 125 allocates subchannels under the control of the controller 170. An operation of controlling subchannel allocation of the subchannel allocator 125 by the controller 170 will be described below.

The P/S converter 135-1 serial-converts the output signal of the IFFT unit 130-1, and outputs the resulting signal to the guard interval inserter 140-1. The guard interval inserter 140-1 inserts a guard interval signal into the output signal of the P/S converter 135-1, and outputs the resulting signal to the D/A converter 145-1. The guard interval is inserted using a Cyclic Prefix (CP) scheme for copying predetermined last samples of a time-domain OFDM symbol and inserting them into an effective OFDM symbol, or a Cyclic Postfix (CP) scheme for copying predetermined first samples of a time-domain OFDM symbol and inserting them into an effective OFDM symbol. The D/A converter 145-1 analog-converts the output signal of the guard interval inserter 140-1, and outputs the resulting signal to the IF/RF processor 150-1. The IF/RF processor 150-1 herein includes a filter and a front-end unit, and performs IF/RF processing to transmit the output signal of the D/A converter 145-1 over the air.

The power amplifier 155-1 power-amplifies the output signal of the IF/RF processor 150-1 according to a gain determined under the control of the controller 170, and transmits the resulting signal over the air via the transmit antenna 160-1. The controller 170 determines a transmission beam vector, and controls a gain of the power amplifier 155-1 according to the determined transmission beam vector. An operation of determining a transmission beam vector by the controller 170 will be described below. The transmission beam vector as used herein refers to a set of transmit antenna gains for each of the multiple transmit antennas, and because the number of the transmit antennas is K, the transmission beam vector includes K elements. Therefore, the controller 170 determines a gain of the power amplifier 155-1 according to an element corresponding to the transmit antenna 160-1 in the transmission beam vector.

A detailed description will now be made of an operation of the controller 170.

The controller 170 performs a scheduling operation according to a predetermined scheduling scheme to select a signal reception apparatus, for example, a Mobile Station (MS), to which the subchannel allocator 125 will allocate a subchannel, and outputs the result to the subchannel allocator 125. The scheduling operation of the controller 170 is not directly related to the present invention, so a detailed description thereof will be omitted herein. Herein, the subchannel is generated taking a Coherent BandWidth (CBW) into consideration, and includes at least one subcarrier. The 'coherent bandwidth' as used herein refers to the maximum bandwidth at which it can be assumed that the channel characteristic is static in a frequency domain. In an embodiment of the present invention, it will be assumed that all subchannels include the same number of subcarriers, and it will also be assumed that the total number of subchannels is B.

The controller 170 estimates a channel response for each individual transmit antenna of an MS allocated a subchannel that the subchannel allocator 125 should currently allocate, and generates a transmission beam vector according to the estimated channel response for each individual transmit antenna. The operation of estimating the channel response for each individual transmit antenna is not directly related to the present invention, so a detailed description thereof will be omitted herein.

The transmit antenna channel response of a subchannel, estimated by the controller 170, can be expressed as Equation (1). The transmit antenna channel response of a subchannel can include a channel response for each individual transmit antenna via which a corresponding subchannel signal is transmitted. That is, because the number of transmit antennas is K, the transmit antenna channel response includes K elements.

$$h_b = [h_{b,1}, h_{b,2}, \ldots, h_{b,k}]^T \quad (1)$$

where b is an index indicating a subchannel, k is an index indicating a transmit antenna, $h_b$ indicates a transmit antenna channel response for a subchannel b, $h_{b,k}$ indicates a channel response of a $k^{th}$ transmit antenna for a subchannel b, and T indicates a transpose operation.

In addition, the controller 170 calculates a transmission beam vector of a subchannel using Equation (2), $$W_b = h_b^* / |h_b|^2 = [W_{b,1}, W_{b,2}, \ldots, W_{b,k}]^T \quad (2)$$

where $W_b$ indicates a transmission beam vector for a subchannel b, $W_{b,k}$ indicates an element to be applied to a $k^{th}$ transmit antenna for a subchannel b, and * indicates a conjugate operation.

After calculating the transmission beam vector for a subchannel b, the controller 170 controls a transmit antenna gain according to the calculated transmission beam vector. The 'transmit antenna gain' as used herein refers to a gain applied to a power amplifier connected to each of transmit antennas for transmitting a corresponding subchannel signal, and the transmit antenna gain also includes K elements. A scheme in which the controller 170 determines the transmit antenna gain can be roughly classified into two schemes: a first scheme and a second scheme. A description will now be made of an operation in which the controller 170 determines the transmit antenna gain according to the first scheme and second scheme. The maximum allowable transmission power, or the maximum power allowable in the BS, will be herein assumed to be $P_{BS,MAX}$.

First, when the controller 170 uses the first scheme, the controller 170 determines a transmit antenna power vector according to Equation (3).

$$W_{b,TX} = \sqrt{(P_{BS,MAX}/B)} \cdot W_b \quad (3)$$

In Equation (3), $W_{b,TX}$ indicates a transmit antenna power vector for a subchannel b. That is, the controller 170 controls to set power of each power amplifier according to $W_{b,TX}$. As a result, when the first scheme is used, the intact transmit antenna gain determined by the transmission beam vector is applied.

As a result, the total power of a signal transmitted over each subchannel is fixed to $P_{BS,MAX}/B$. In this case, power $P_{k,TX}$ of a signal transmitted via each transmit antenna can be expressed as Equation (4), and power $P_{BS,TX}$ used by the BS can be expressed as Equation (5).

$$P_{k,TX} = \sum_b P_{BS,MAX}/B \cdot |W_{b,k}|^2 \quad (4)$$

$$P_{BS,TX} = \sum_b P_{BS,MAX}/B \cdot |W_b|^2 = P_{BS,MAX} \quad (5)$$

That is, the controller 170, when it uses the first scheme, determines as a reference transmit antenna a transmit antenna having the highest power of a signal transmitted from among the K transmit antennas, and determines the transmit antenna gain on the basis of the power of a signal transmitted via the reference transmit antenna. The power of a signal transmitted via a transmit antenna will be referred to herein as 'transmit antenna power'. In this case, a phenomenon can happen in which transmit antenna power is concentrated on a particular transmit antenna according to a channel response, and this is shown in FIG. 2.

FIG. 2 is a table illustrating a phenomenon in which power concentration on a particular transmit antenna happens when the controller 170 determines a transmit antenna gain using the first scheme.

Shown in FIG. 2 are a channel response $h_{b,k}$ and a transmission beam vector $W_{b,k}$ of a $k^{th}$ antenna for a subchannel b of each of multiple, for example, 4 transmit antennas, and a square $|W_{b,k}|^2$ of the transmission beam vector $W_{b,k}$.

A $|W_{b,k}|^2$ value of a transmit antenna with a transmit antenna index 1 among the 4 transmit antennas is 0.94, which is remarkably greater than a $|W_{b,k}|^2$ value of the remaining transmit antenna 2, transmit antenna 3, and transmit antenna 4. That is, it can be noted that transmit antenna power is concentrated on the transmit antenna 1.

In the foregoing case where the controller 170 determines the transmit antenna gain using the first scheme, if the channel responses of the individual transmit antenna are different from each other as the MS experiences fading, a phenomenon may happen in which transmit antenna power is concentrated on a particular transmit antenna. The power of a power amplifier used for the communication system needs a margin according to the power concentration level, causing an increase in the cost and power consumption of the communication system.

Therefore, the controller 170 determines a transmit antenna gain using the second scheme, and in this case, the transmit antenna gain is determined on the basis of a transmit antenna, currently unused power of which is at a minimum, among the transmit antennas.

A description will now be made of an operation in which the controller 170 determines a transmit antenna gain using the second scheme.

The controller 170 uses the intact transmit antenna channel response and transmission beam vector for a subchannel b determined according to Equation (1) and Equation (2). In addition, the controller 170 calculates a headroom for each of the transmit antennas. The 'headroom' is defined herein as a ratio of the maximum allowable total transmit antenna power $P_{ANT,MAX}$ to the actually used transmit antenna power $P_{k,TX}$ for a corresponding subchannel as shown in Equation (6). The 'maximum allowable total transmit antenna power' as used herein refers to a sum of transmit antenna power for each of all or K transmit antennas used for transmitting the corresponding subchannel signal.

$$P_{k,head\text{-}room} = P_{ANT,MAX}/P_{k,TX} \quad (6)$$

where $P_{k,TX}$ is defined as Equation (7).

$$P_{k,TX} = \sum_b P_{ANT,MAX}/B \cdot |W_{b,k}|^2 \quad (7)$$

Second, the controller 170 calculates a transmit antenna power vector by performing normalization of a transmission beam vector using Equation (8) on the basis of a headroom value a of a transmit antenna whose headroom is minimum within a scope satisfying a BS transmission power restriction ($P_{ANT,MAX} \leq P_{BS,MAX}$), or of a transmit antenna, currently unused transmit antenna power of which is minimum.

$$W_{b,TX,NEW} = \alpha \cdot \sqrt{(P_{BS,MAX}/B)} \cdot W_b \quad (8)$$
$$= \alpha \cdot W_{b,TX}$$

where $\alpha$ denotes a weight for control of a transmit antenna gain, and is defined as a headroom of a transmit antenna whose headroom is minimum. The controller 170 calculates the $\alpha$ value using Equation (9) to Equation (11).

The controller 170 calculates a headroom value $P_{k,head\text{-}room}$ for each individual transmit antenna, and calculates an $\alpha_1$ value defined as Equation (9) using a headroom value of a transmit antenna having the minimum value among the calculated $P_{k,head\text{-}room}$ values.

$$\alpha_1 = \sqrt{P_{k,head\text{-}room}}; k_0 = \arg_k \min P_{k,head\text{-}room} \quad (9)$$

If the $\alpha_1$ value is found, the controller 170 calculates a BS transmission power restriction value $\alpha_2$ as expressed in Equation (10).

$$\alpha_2 = \sqrt{P_{BS,MAX}/P_{BS,TX}} = \sqrt{P_{BS,MAX}/P_{ANT,MAX}} \quad (10)$$

If the $\alpha_1$ value and the $\alpha_2$ value are found, the controller 170 compares the calculated $\alpha_1$ value with the calculated $\alpha_2$ value, and determines the lesser value as a $\alpha$ value as expressed in Equation (11).

$$\alpha = \min(\alpha_1, \alpha_2) \quad (11)$$

That is, the $\alpha_1$ value is determined as a $\alpha$ value only within the scope where it is less than the BS transmission power restriction value $\alpha_2$. That is, if the $\alpha_1$ value is greater than the $\alpha_2$ value, the $\alpha_2$ value is determined as a $\alpha$ value. As a result, the controller 170, when it uses the second scheme, controls a transmit antenna gain according to the transmission beam vector multiplied by the weight $\alpha$.

A description will now be made of an operation of determining a transmit antenna gain using the second scheme, for example, when the transmission beam vector value is always $|W_{b,k}|^2=1/k$ for all b and all k, i.e. when the transmission beam vector value is constant.

In this case, the $P_{k,TX}$ value is $P_{ANT,MAX}/K$ (for all K), and is constant for all K transmit antennas. Using Equation (6) and Equation (9), the $\alpha_1$ value is defined as 'sqrt(k)' because it is a positive square root of a value obtained by dividing $P_{ANT,MAX}$ by $P_{ANT,MAX}/K$ (for all K). As for the $\alpha_2$ value, using Equation (6) and Equation (10), because a $P_{BS,MAX}$ value indicates a product of $P_{ANT,MAX}$ and B, a positive square root of a value obtained by dividing the product of $P_{ANT,MAX}$ and B by the $P_{ANT,MAX}$ value is 'sqrt($P_{BS,MAX}/P_{ANT,MAX}$)'. Therefore, because the B value is generally greater than the K value, a lesser value $\alpha_1$=sqrt(k) out of the $\alpha_1$ value and the $\alpha_2$ value is managed as the $\alpha$ value, and the $P_{ANT,MAX}$ value is selected as a $P_{BS,MAX}/K$ value.

By determining a transmit antenna gain on the basis of a transmit antenna, currently unused power of which is minimum, i.e. a transmit antenna with the minimum headroom, using the second scheme as described above, the power amplifiers corresponding to the transmit antennas control a transmit antenna gain according to the transmission beam vector obtaining the greater transmission gain. Specifically, when the $\alpha$ value exceeds 1, i.e. when $P_{k,TX}$ is less than $P_{ANT,MAX}$, the power amplifiers, under the control of the controller 170, can assign a greater data rate, or Modulation & Coding Selection (MCS) level, to transmit a transmission signal taking into account the gain obtained depending on the transmission beam vector multiplied by the $\alpha$ value. For example, if the $\alpha$ value has a gain of 1.5, i.e. a gain of about 3.5 dB, the controller 170, which was using a QPSK ½ rate during transmission of a transmission signal, can assign a QPSK ⅔ modulation rate being greater than the QPSK ½ modulation rate by following the second scheme of the present invention.

A description will now be made of an operation in which the controller 170 according to an embodiment of the present invention determines a transmission beam vector and controls transmission power of the power amplifiers according to the determined transmission beam vector.

Figure 3:
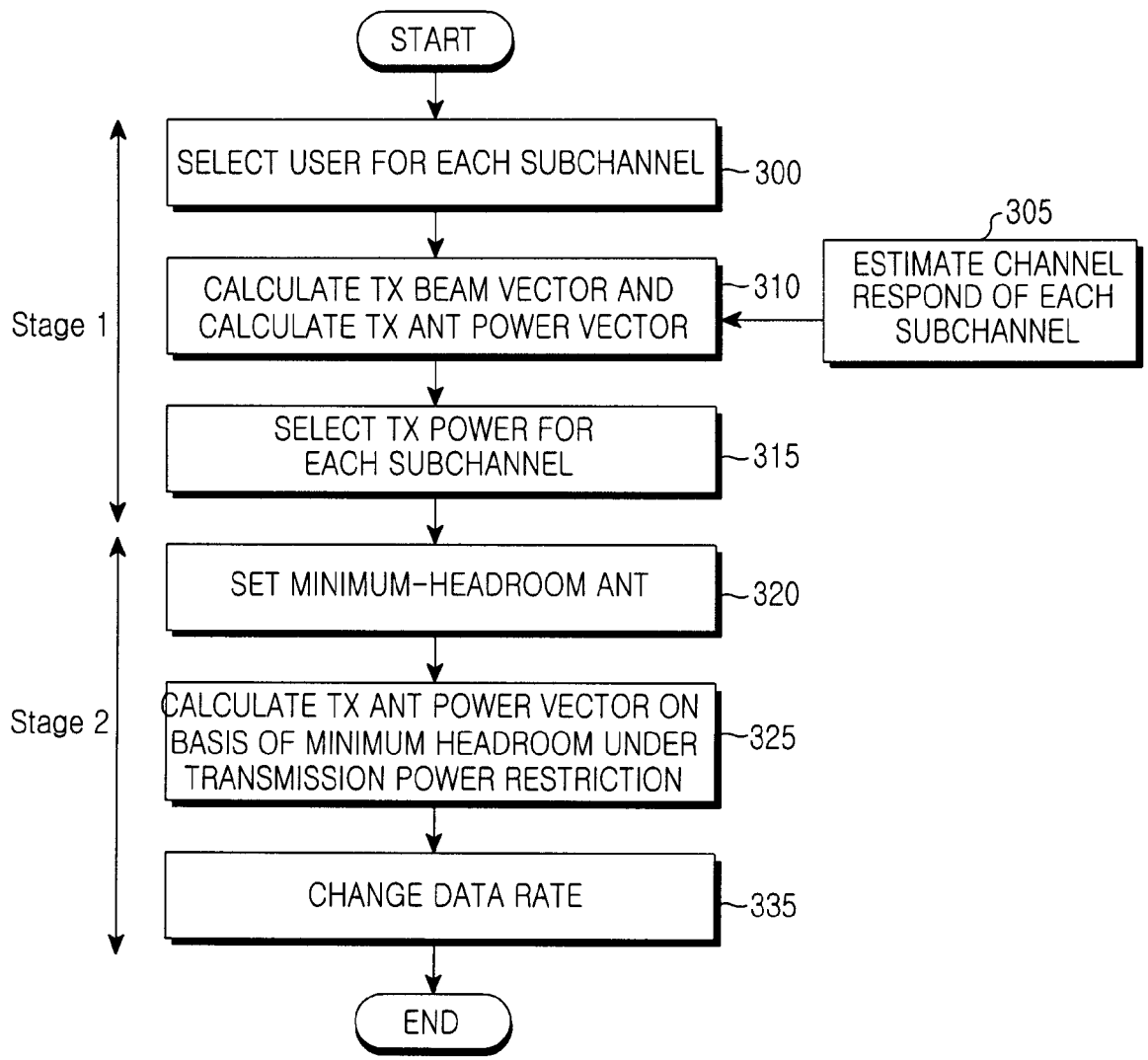
FIG. 3 is a diagram illustrating a transmission power gain control procedure of a transmission apparatus according to an embodiment of the present invention.

FIG. 3 is a diagram illustrating a transmission power gain control procedure of a transmission apparatus according to an embodiment of the present invention. The transmission power gain control procedure can be roughly divided into a first stage of calculating a transmission beam vector separately for each subchannel and setting a transmit antenna power vector according to the calculated transmission beam vector, and a second stage of determining a gain of transmit antennas on the basis of a transmit antenna, currently unused power of which is minimum, and changing a data rate for each corresponding individual subchannel based on a gain generated through normalization of a transmission beam vector for each individual antenna.

Referring to FIG. 3, the first stage includes steps 300 to 315.

In step 300, the controller 170 performs a scheduling operation according to a predetermined scheduling scheme to select a terminal or a user to which the subchannel allocator 125 will allocate a subchannel. The user selection scheme is not directly related to the present invention, so a description thereof will be omitted herein.

In step 305, the controller 170 estimates a channel response $h_{b,k}$ for each individual transmit antenna of a user who will be allocated the subchannel that the subchannel allocator 125 should allocate. In step 310, the controller 170 calculates a transmission beam vector according to the estimated $h_{b,k}$ value using Equation (2), and then calculates a transmit antenna power vector for each individual subchannel using Equation (3). In step 315, the controller 170 controls to set power of a corresponding power amplifier according to the transmit antenna power vector for each individual subchannel using Equation (4).

The second stage includes steps 320 to 335.

In step 320, the controller 170 calculates a headroom value $P_{k,head-room}$ for each of the transmit antennas using Equation (6), and selects a $\alpha$ value depending on a headroom value of a transmit antenna having the minimum value among the calculated $P_{k,head-room}$ values, using Equation (9) to Equation (11).

In step 325, the controller 170 calculates a transmit antenna power vector on the basis of the a value selected as a headroom value of a transmit antenna having the minimum headroom value within the scope satisfying a BS transmission power restriction ($P_{ANT,MAX} \leq P_{BS,MAX}$). In step 335, the controller 170 assigns an efficient data rate, or MCS level, based on a gain of the transmit antenna power, generated by controlling transmit antenna gain of the power amplifiers according to the transmit antenna power vector.

Thereafter, transmission data is transmitted via the multiple antennas based on the assigned MCS level.

FIG. 4 is a table showing a change in a data rate of a transmission apparatus according to an embodiment of the present invention.

Referring to FIG. 4, the transmission apparatus estimates a data rate 400 of each antenna according to the first scheme of the present invention using Equation (1) to Equation (3) in a system where 4 antennas are used and the $P_{BS,MAX}$ value is 20 watt, and estimates a data rate 410 of each antenna according to the second scheme of the present invention using Equation (6) to Equation (11).

Specifically, for the antenna power values $P_{ANT,MAX}$ of 5 watt and 7 watt, it can be noted that a data rate of an antenna based on the second scheme increases about 5~10%, compared to a data rate of an antenna based on the first scheme.

As described above, the transmission apparatus generates a transmit antenna power vector on the basis of a headroom value of an antenna having the minimum subchannel headroom, and controls transmission power of power amplifiers according to the transmit antenna power vector, thereby allowing the service provider to obtain the equivalent result to that of power amplifiers consuming the existing transmission power, with use of the power amplifiers consuming the less transmission power.

As is apparent from the foregoing description, the present invention controls power of power amplifiers according to a transmit antenna power vector for each individual subchannel on the basis of a headroom value of an antenna having the minimum headroom value separately for each antenna, thereby obtaining the equivalent result to that of the existing power amplifiers, with use of the power amplifiers consuming less power, and also enabling assignment of a higher data rate.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for controlling a gain of multiple transmit antennas in a communication system including a Base Station (BS) having multiple transmit antennas, the apparatus comprising:

a controller for determining a gain of the multiple transmit antennas using a minimum currently unused residual power among currently unused residual powers of the multiple transmit antennas, wherein each of the currently unused residual powers indicates a headroom defined as a ratio of a maximum power available for transmitting a signal via a power of a signal currently transmitted via a corresponding transmit antenna.

2. The apparatus of claim 1, wherein the controller compares a first weight obtained by calculating a positive square root of a minimum headroom value among headroom values of the multiple transmit antennas, with a second weight obtained by calculating a positive square root of a ratio of a maximum allowable transmission power of a corresponding BS to a transmission power currently used by the BS, and determines a lesser of the first and second weights as a third weight; and determines a gain of the multiple transmit antennas by a product of (i) the third weight, (ii) a transmission beam vector calculated as a set of transmit antenna gains for the multiple transmit antennas, and (iii) a positive square root of a value obtained by dividing a maximum allowable total transmit antenna power for a corresponding subchannel by a total number of subchannels.

3. The apparatus of claim 2, wherein the corresponding subchannel is generated taking into account a coherent bandwidth indicating a maximum bandwidth at which it can be assumed that a channel characteristic is static in a frequency domain, and the subchannel includes at least one subcarrier.

4. The apparatus of claim 2, wherein the controller calculates a weight for controlling a transmit antenna gain, and determines a transmission beam vector of a transmit antenna by a product of the weight for controlling the transmit antenna gain and a transmit antenna power vector; and determines a gain of the multiple transmit antennas according to the transmission beam vector of the transmit antenna.

5. The apparatus of claim 4, wherein the weight for controlling a transmit antenna gain is determined by calculating a headroom value for each corresponding individual transmit antenna, comparing a first weight obtained by calculating a positive square root of a minimum antenna headroom value among the calculated headroom values, with a second weight obtained by calculating a positive square root of a ratio of a maximum allowable transmission power of a corresponding BS to a transmission power currently used by the BS, and selecting a lower one of the first and second weights.

6. The apparatus of claim 5, wherein the transmission beam vector is determined by performing, by the controller, a transpose operation on a channel response for each of the multiple transmit antennas, estimated from mobile stations mapped to a corresponding individual subchannel, and dividing a conjugate value of the channel response by a square of an absolute value of the channel response.

7. The apparatus of claim 4, wherein the transmit antenna power vector is calculated by a product of a transmission beam vector and a positive square root of a value obtained by dividing a maximum allowable total transmit antenna power for the corresponding subchannel by a total number of subchannels.

8. A method for controlling a gain of multiple transmit antennas in a communication system including a Base Station (BS) having multiple transmit antennas, the method comprising:

determining, by the controller, a gain of the multiple transmit antennas using a minimum currently unused residual power among currently unused residual powers of the multiple transmit antennas, wherein each of the currently unused residual powers indicates a headroom defined as a ratio of a maximum power available for transmitting a signal via a power of a signal currently transmitted via a corresponding transmit antenna.

9. The method of claim 8, further comprising:

comparing a first weight obtained by calculating a positive square root of a minimum headroom value among headroom values of the multiple transmit antennas, with a second weight obtained by calculating a positive square root of a ratio of a maximum allowable transmission power of a corresponding BS to a transmission power currently used by the BS, and determining a lesser of the first and second weights as a third weight; and determining a gain of the multiple transmit antennas by a product of (i) the third weight, (ii) a transmission beam vector calculated as a set of transmit antenna gains for the multiple transmit antennas, and (iii) a positive square root of a value obtained by dividing a maximum allowable total transmit antenna power for a corresponding subchannel by a total number of subchannels.

10. The method of claim 9, wherein the corresponding subchannel is generated while taking into account a coherent bandwidth indicating a maximum bandwidth at which it can be assumed that a channel characteristic is static in a frequency domain, and the subchannel includes at least one subcarrier.

11. The method of claim 9, further comprising:

calculating a weight for controlling a transmit antenna gain, and determining a transmission beam vector of a transmit antenna by a product of the weight for controlling the transmit antenna gain and a transmit antenna power vector; and determining a gain of the multiple transmit antennas according to the transmission beam vector of the transmit antenna.

12. The method of claim 11, wherein the weight for controlling a transmit antenna gain is determined by calculating a headroom value for each corresponding individual transmit antenna, comparing a first weight obtained by calculating a positive square root of a minimum antenna headroom value among the calculated headroom values, with a second weight obtained by calculating a positive square root of a ratio of a maximum allowable transmission power of a corresponding BS to a transmission power currently used by the BS, and selecting a lower one of the first and second weights.

13. The method of claim 12, wherein the transmission beam vector is determined by performing a transpose operation on a channel response for each of the transmit antennas, estimated from mobile stations mapped to a corresponding individual subchannel, and dividing a conjugate value of the channel response by a square of an absolute value of the channel response.

14. The method of claim 11, wherein the transmit antenna power vector is calculated by a product of a transmission beam vector and a positive square root of a value obtained by dividing a maximum allowable total transmit antenna power for the corresponding subchannel by a total number of subchannels.

* * * * *